UNITED STATES PATENT OFFICE.

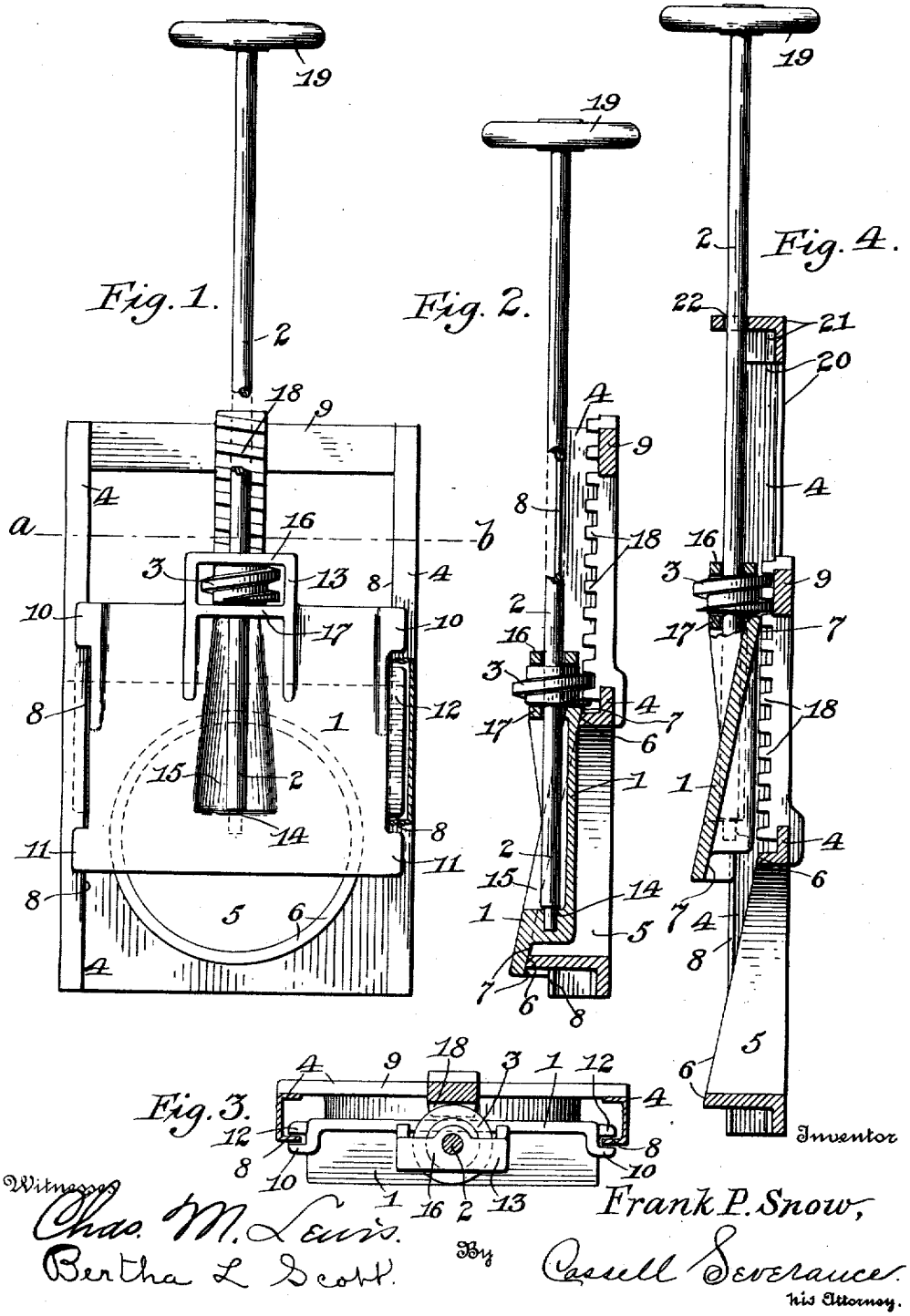

FRANK P. SNOW, OF LOS ANGELES, CALIFORNIA.

GATE-VALVE.

1,012,173.     Specification of Letters Patent.     Patented Dec. 19, 1911.

Application filed July 7, 1910.   Serial No. 570,697.

*To all whom it may concern:*

Be it known that I, FRANK P. SNOW, a citizen of the United States, residing at Los Angeles, in the county of Los Angeles and State of California, have invented certain new and useful Improvements in Gate-Valves, of which the following is a specification.

This invention relates to improvements in valves, gates or liquid cut offs or the like and has for its object among other things, the provision of a simple and yet effective water or liquid controlling mechanism, which shall be particularly well adapted for use in connection with open water ways, as for instance irrigating ditches and the like, but which is also adapted for use in connection with closed water ways as conduits, piping or the like.

With this and other objects in view, the invention consists in certain novel constructions, combinations and arrangements of parts as will be hereinafter fully described and claimed.

In the accompanying drawing, forming a part of this specification, Figure 1 is a front elevation of a water gate or valve constructed in accordance with the present invention. Fig. 2 is a vertical central section through the said gate, the actuating stem and gear being shown in elevation. Fig. 3 is a transverse horizontal sectional view through the gate mechanism, taken upon the line *a—b* of Fig. 1 and, Fig. 4 is a vertical central section through a modified form of gate mechanism, showing a guide or brace for the gate or valve stem when the said stem is very long.

The present invention is designed to provide a water or liquid controlling gate, which though simple in structure and readily made without great expense, is very effective for shutting off and controlling the flow of liquids.

The device of the present invention is particularly useful in connection with irrigation systems, where comparatively large water gates are required at a number of points for regulating and controlling the supply of water in open ditches, flumes or the like. The gate, however, is also adapted for use in connection with closed conduits or piping and in many other places where sliding valves or gates are required.

In the accompanying drawing is illustrated the preferred form of gate or valve and the features of the invention will now be particularly described, reference being had to said drawing.

In the drawing 1 designates the gate or valve proper, 2 a valve stem therefor, 3 an actuating gear and 4 a guide frame for the valve mechanism. The gate 1 is generally formed of a broad approximately rectangle plate of greater size than the mouth 5 of the liquid orifice to be opened and closed. The valve or gate seat 6 surrounding the said orifice projects from the lower part of the frame 4, in which it is mounted and the face of said seat is obliquely arranged or set at an angle to the vertical plane of the frame 4 as clearly shown in Figs. 2 and 4. The gate 1 is also set at a corresponding angle and a seating face 7 is formed thereon and made to fit smoothly and closely upon the valve or gate seat 6 when the gate is closed. The guides for the movement of the gate are afforded by inwardly turned edges 8 formed upon the side upright parts of the frame 4 and rise to a suitable height to permit of the gate being lifted entirely above the orifice 5. The side portions of the frame 4 are braced near the top by a transverse bar 9, as clearly shown in Fig. 1 of the drawing.

The side edges of the gate or valve 1 are made of sufficient width to carry laterally projecting top and bottom guide flanges 10 and 11 and intermediate flanges 12 for engaging the guides 8 upon the frame, the flanges 10 and 11 projecting beyond one face of each guide, while the flanges 12 project upon the other side thereof, as will be evident by reference to Fig. 3 of the drawing. The actuating means for the gate 1 is carried by the said gate and is made up of the gate or valve stem 2 which is journaled in a framing 13 formed upon the upper edge of the gate 1, the lower end of said stem also being journaled at 14 in the body portion of the gate. A depression 15 is formed in the inclined body portion of the gate to accommodate the stem 2 and to provide the bearing for the lower end thereof. Rigidly secured to the stem 2 between the transverse portions 16 and 17 of the framing 13, is the actuating gear 3. The gear 3 is preferably in the form of a short worm, as shown in the drawings which engages a fixed rack 18 mounted upon the frame 4 immediately to one side of the stem 2 and gate 1. The lower end of the rack 18 is preferably secured to the plate carrying the valve seat 6 while its upper end extends to the brace 9 and may project as far above the same as desired, this being regulated by the height to which it is necessary to elevate the gate when it is entirely open. If desired, the plate with the valve seat 6 and the side bars of the frame 4 together with the transverse brace 9 and the rack 18 may all be cast in a single piece and this is a simple and economical way of producing the mechanism. It should be understood, however, that the parts just named can be made separately and fastened together in any desired manner without departing in the least from the spirit of the invention. The valve stem 2 projects to any desired height above the gate and is provided at its upper end with a hand or operating wheel 19, for turning the said stem. It will be apparent that the rotation of the stem 2 will turn the worm 3 and cause it to travel up and down the rack 18 for reciprocating the gate 1.

It will be observed that because of the inclined arrangement of the gate 1 and the valve seat 6, that the friction between the said gate and seat is relieved quickly upon withdrawing the gate in opening the orifice 5 and that the remainder of the movement of the said gate mechanism, is free and easy. When the valve is to be closed, its seating face can, however, be forced tightly upon the inclined valve seat 6 so as to produce a tight joint and entirely prevent the passage of water or other liquids through the orifice 5. As it is only necessary to nicely finish the valve seat and the seating face upon the gate, the parts of the mechanism can be cast and thus made in an economical manner.

When the valve stem is to be made very long, it is sometimes desirable to give it additional support beyond that afforded by the gate itself and in such cases, the gate frame is extended to a greater height as indicated at 20 in Fig. 4 and a transverse bar 21 extending from side to side affords an upper journal bearing for the gate stem, as at 22. It will thus be evident that the framing of the gate can be readily adapted to the various conditions that are to be met in placing the gate or gates in an irrigating system or extensive water ways without departing from the spirit of the invention. It will also be understood that while I have shown and described, the preferred form of gate mechanism, I consider all mechanical equivalents of the features described as entirely within the scope of the invention.

Having now described my invention what I claim as new and desire to secure by Letters Patent, is:—

1. A liquid controlling gate mechanism comprising a reciprocating gate, an actuating gear carried thereby, a fixed rack adjacent to the gate and engaging said actuating gear and means journaled upon and held in position by said gate for turning the gear to reciprocate the gate.

2. A liquid controlling gate mechanism comprising a sliding gate, a rotating gate stem journaled upon one face of said gate for holding it to its seat, a gear carried by said stem and a rack fixed adjacent to the gate and engaging said gear, the rotation of the gear against the rack producing a reciprocation of the gate.

3. A gate mechanism comprising a frame, a rack formed thereon, a sliding gate mounted loosely in the frame, a gate stem journaled upon one face of the valve, a worm gear fixed to the said stem and engaging the rack on the frame, for effecting the reciprocation of the gate.

4. A liquid controlling gate mechanism comprising a guide frame, a rack formed thereon, a sliding gate guided in said frame, a valve stem journaled upon the gate and held in operative position thereby, a worm gear secured to the valve stem and having bearings upon portions of the gate, the said worm gear, when rotated producing a reciprocating movement in the gate in conjunction with the said rack.

5. A liquid controlling gate mechanism comprising a frame having an inclined valve seat formed thereon, a sliding gate moving in the frame and having an inclined seating face capable of fitting upon the inclined valve seat, an actuating gear carried by the gate, means for turning the same mounted on one face of the valve, and a toothed rack carried by the frame and meshing with the gear on the gate, the turning of the latter gear effecting the reciprocation of the gate.

6. A water gate mechanism comprising a frame having an inclined valve seat, a gate having an inclined body portion for engaging said seat, inwardly projecting guides on the said frame, the said gate having outwardly extending projections for engaging the said guides and directing the movement of the gate, a fixed rack bar on the said frame, a rotating worm gear carried by the gate and engaging the said rack bar and means also carried by the gate for rotating the said worm gear.

7. A water gate mechanism comprising a reciprocating gate, a gate stem journaled thereon, an actuating worm secured to the said stem, a bearing frame formed on the gate and having a bearing on each end of the said actuating worm, and a fixed rack arranged adjacent to the gate and engaging the actuating gear.

8. A water gate mechanism comprising a reciprocating gate, a guide frame therefor having a fixed rack arranged adjacent to the gate, a valve stem journaled upon the gate, a worm gear carried by the said stem and engaging the fixed rack for accomplishing the movement of the gate, a bracing guide upon the frame loosely engaging the said stem for supporting its upper end and a hand wheel secured to the stem for turning it.

In testimony whereof, I have hereunto set my hand, in presence of two witnesses.

FRANK P. SNOW.

Witnesses:
FRANK P. SHERMAN,
CASSELL SEVERANCE.

Copies of this patent may be obtained for five cents each, by addressing the "Commissioner of Patents, Washington, D. C."